June 22, 1971 N. R. WILSON 3,585,683
BLOW MOLDING APPARATUS
Filed March 11, 1968 2 Sheets-Sheet 1

INVENTOR.
N. R. WILSON
BY
*Young & Quigg*
ATTORNEYS

June 22, 1971   N. R. WILSON   3,585,683
BLOW MOLDING APPARATUS
Filed March 11, 1968   2 Sheets-Sheet 2
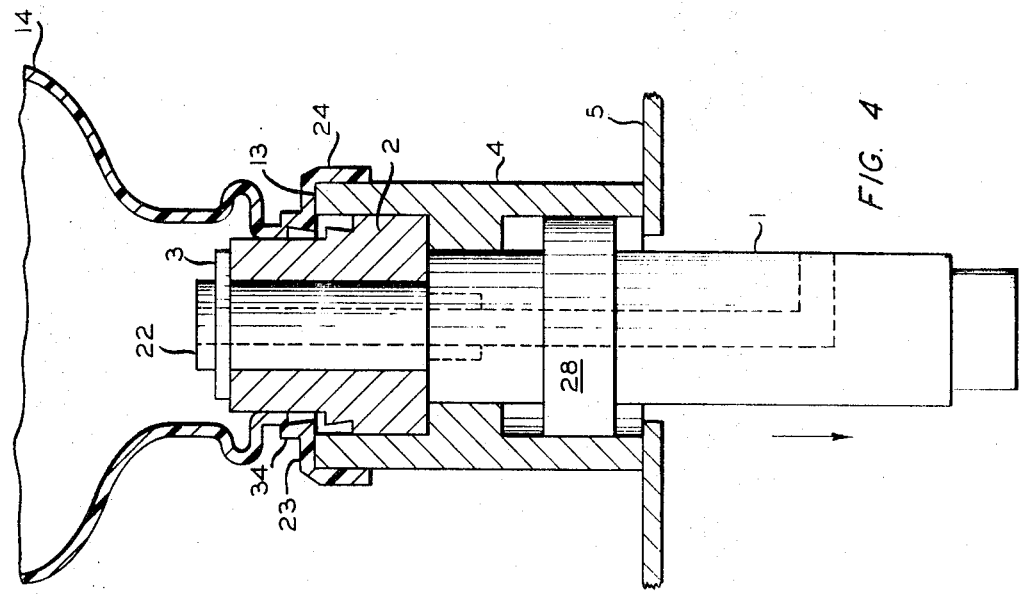
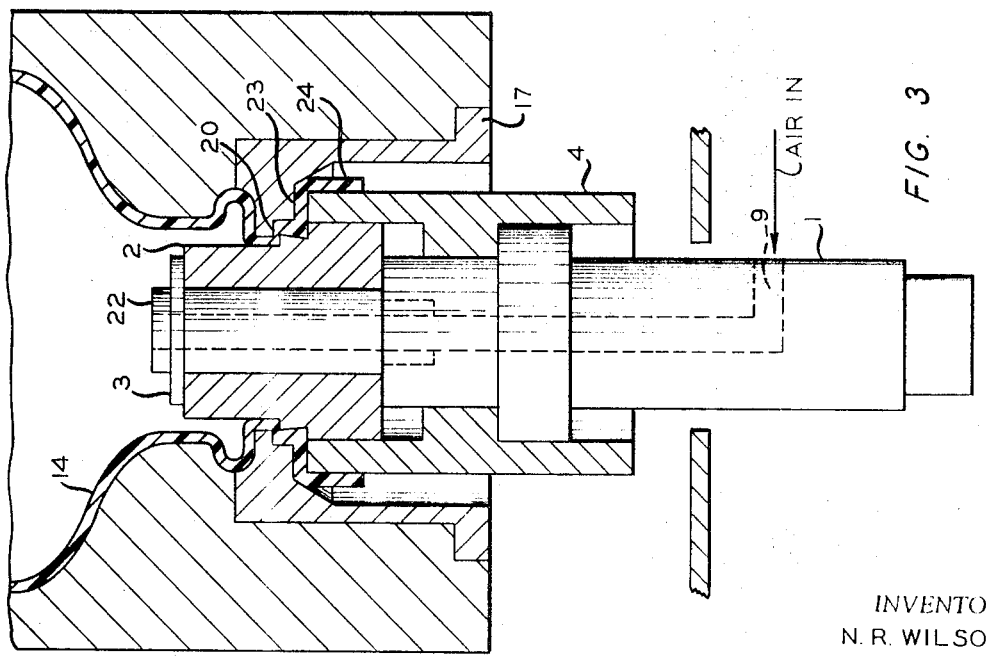
INVENTOR.
N. R. WILSON
BY
ATTORNEYS 3,585,683
BLOW MOLDING APPARATUS
Newton R. Wilson, Bartlesville, Okla., assignor to
Phillips Petroleum Company
Filed Mar. 11, 1968, Ser. No. 712,282
Int. Cl. B29d 23/03
U.S. Cl. 18—5                                    3 Claims

ABSTRACT OF THE DISCLOSURE

A blow molding apparatus comprises an exterior neck mold positioned in separable mold halves at one extremity of the mold cavity and axially reciprocally mounted interior neck molding means comprising an interior neck mold and circumferentially disposed sleeve as an interior lip mold, the interior neck mold being axially retractable relative to said sleeve and a fluid conduit within said interior neck mold communicating between the interior of said mold cavity and a fluid source.

BACKGROUND OF THE INVENTION

Maximum permissible cycle times for the operation of article molding apparatus are of considerable importance in evaluating the desirability of such machines. In addition, the characteristics of the molded article impose certain limitations not only on overall cycle time, but, in addition, determine to a great extent the requiremens of the apparatus employed to fabricate those articles.

I have discovered an apparatus for producing containers having neck portions suitable for receiving disc closures to render the container fluid-tight. The apparatus of this invention enables the production of such containers in a simple one-step cycle of relatively short duration.

It is therefore one object of this invention to provide improved blow molding apparatus. It is another object of this invention to provide an improved apparatus for forming the neck portions of blow molded articles. It is yet another object of this invention to provide an apparatus suitable for producing blow molded articles having neck portions sealable by a simple disc closure.

SUMMARY OF THE INVENTION

In accordance with one embodiment of this invention, a blow molding apparatus comprises at least two severable mold halves defining a mold cavity and having exterior neck molds at one extremity of the cavity and axially reciprocally mounted interior neck mold means and interior lip molding means comprising a sleeve circumferentially disposed about the interior neck molding means, the latter being relatively axially retractable relative to the sleeve.

Figure 2:
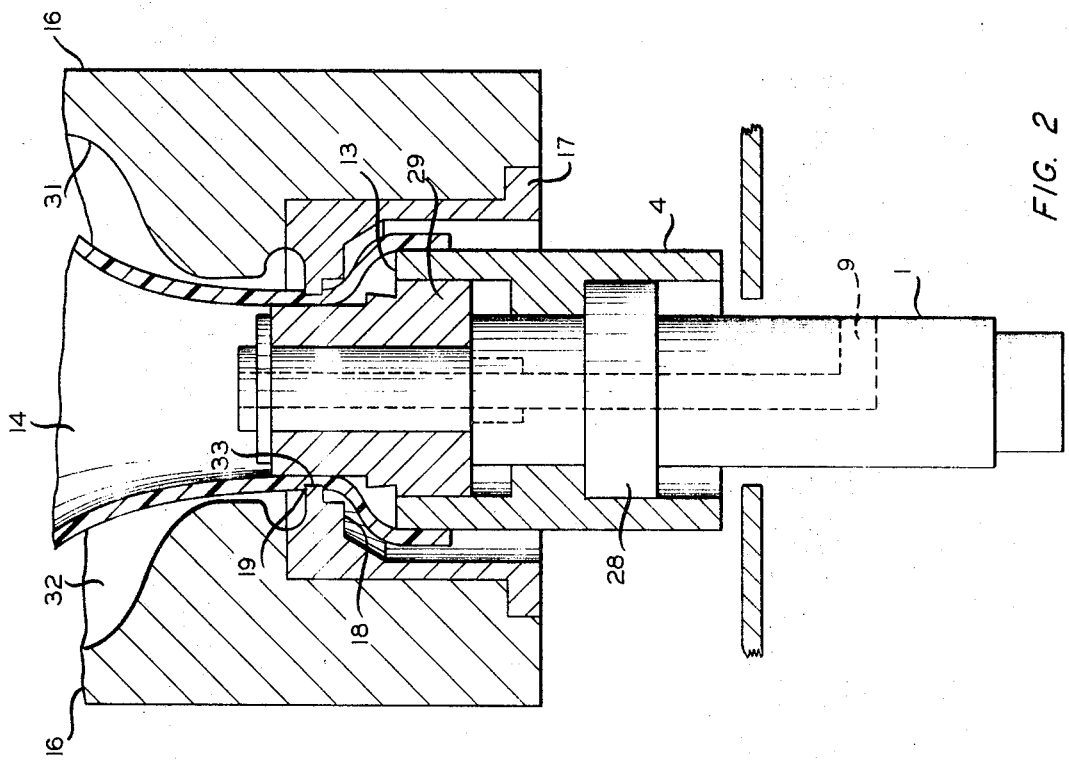
Figure 1:
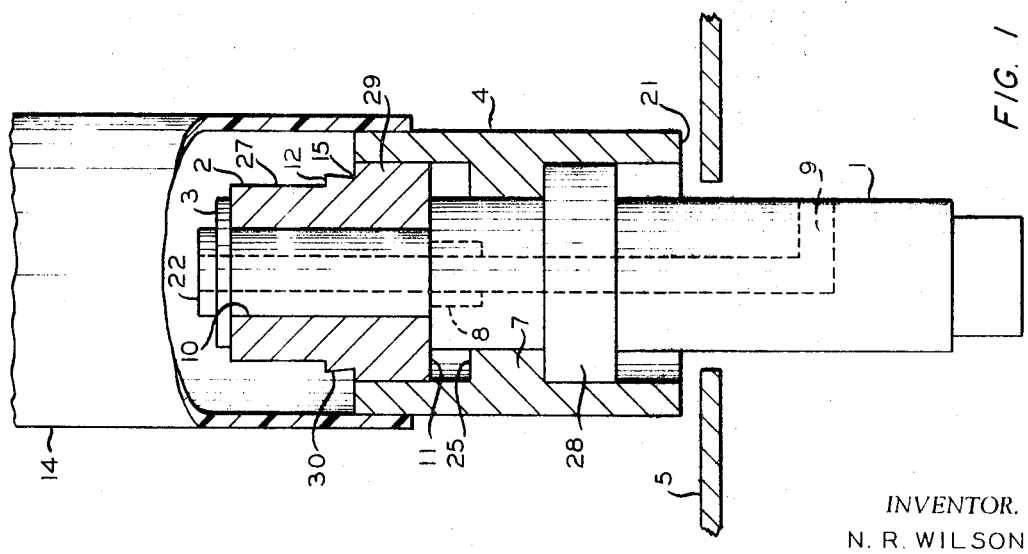

The apparatus of this invention can be better understood by reference to the drawings, of which FIG. 1 is a sectional view of the neck mold of this invention in combination with a parison to be formed; FIG. 2 is a sectional view of the apparatus of FIG. 1 in combination with a molding cavity having exterior neck molding means; FIG. 3 is a sectional view of the same apparatus illustrated in cooperation of the several neck mold parts and FIG. 4 is a sectional view of the interior neck molding apparatus and the molded article with the interior neck mold being retracted. These figures and the descriptions thereof are intended only to be illustrative of the concept of this invention and should not be construed to limit the application of this idea.

Referring now to FIG. 1, the presently preferred apparatus of this invention comprises drive shaft 1 fixedly threaded at 8 to lock pin 22 having retaining flange 3 at its axial extremity whereby the interior neck mold 2 is retained between flange 3 and drive shaft 1. The drive shaft and interior neck mold are mounted within sleeve or housing 4 having interiorly extending collar 7 which coacts with the annular collar 28 on drive shaft 1 and collar 29 on the interior neck mold at surfaces 11 and 25 to limit the axial movement of the neck mold assembly relative to the sleeve. The sleeve or housing 4 is supported on housing support plate 5 when the assembly is retracted downwardly.

This apparatus is particularly designed to produce containers having neck portions capable of receiving disc closures to produce fluid-tight seals. This feature of the article neck is provided by causing parison 14 to conform to the surface of the interior neck mold 2, particularly in the area of annular ridge 30 which tapers axially outwardly from annular collar 29 to a maximum diameter at 12 and then preferably extends radially inwardly to the minimum diameter of the interior neck mold. As a result, the diameter of the annular ridge 30 is preferably greater at this extremity 12 than at the junction of the annular ridge and annular collar 29, i.e., at 15.

In the preferred embodiment of this invention, the drive shaft or blow pin 1 is further provided an interior conduit 9 passing through the drive shaft and lock pin 22 so as to provide a means of communication between a source of pressurized fluid and the interior of the parison during the molding cycle.

At the commencement of the cycle, the neck molding assembly is as illustrated in FIG. 1 wherein the housing or interior lip mold 4 is supported by annular collar 28 on drive shaft 1. At this point, the interior rim mold 4 is not in contact with support plate 5. Parison 14 is lowered over the assembly as illustrated in FIG. 1, after which the mold parts are closed about the parison as illustrated in FIG. 2. In this illustration, the remainder of the mold consists of identical mold halves 16 to which the exterior neck molds 17 are attached at the lower extremity of the mold cavity 32. Each of the exterior neck mold parts 17 are provided with radially inwardly protruding ridge 33 which defines a circle of minimum diameter when the mold parts are completely closed. As the mold is closed, the ridge 33 of each exterior neck mold part force parison 14 inwardly until it contacts the surface of minimum diameter 27 of the interior neck mold. The clearance between these two parts when the mold is in a closed position must, of course, be sufficient to prevent severance of parison 14 yet at the same time should be somewhat less than the original thickness of the parison side wall. It is presently preferred that the clearance between the exterior neck mold at this point and the interior neck mold be about 20 percent less than the thickness of the parison side wall. This preference derives from the desirability of preventing excessive distortion of the parison material under the influence of shearing forces which results from the relative axial movement of surface 27 of the interior neck mold and ring 33 of the exterior portion.

After the mold has been closed as illustrated in FIG. 2, the drive shaft 1 is forced upwardly to conform the lower extremity of parison 14 into the configuration of the interior and exterior neck mold parts. By this procedure, the upper surface 13 of housing or interior lip mold 4 forces the parison against the flat portion 18 of the exterior neck mold while the annular ridge 30 forces a portion of the parison to conform to the surface of the exterior neck mold part at surface 19, as illustrated in FIG. 3. In this step, it is preferred to extend the interior neck mold 2 into the mold cavity under sufficient pressure to effect the compression and flow of parison material in the vicinity of lip 23 and annular ring 20. By virtue of this compression, some of the heated parison material in this area is caused to conform to the configuration of annular ridge 30 on the interior neck mold 2 whereby the interior side wall of the container neck extends axially inwardly from ring 20 then radially outwardly to form lip 23. This inward axial extension provides a snap-seat into which a disc closure can be forced and fixedly held by simple contact with the container side wall.

After the interior neck mold has been forced into alignment with the exterior neck mold to form the container neck portion as illustrated in FIG. 3, compressed fluid, preferably air or cooling fluid such as $CO_2$ is passed into the injection conduit 9 and into the interior of parison 14 to force the parison side walls to conform to the interior wall 31 of the mold cavity 32. When the body of the container has been formed and cooled by this procedure, the mold halves 16 are retracted to free the container and drive shaft 1 is retracted as illustrated in FIG. 4. When the drive shaft has been retracted a sufficient amount the lower extremities of housing or interior rim mold 4 contact the upper surface of support plate 5 thereby forcing the relative upward movement of housing 4 and the relative downward movement of interior neck mold 2. As a result of this procedure, the container neck portion is restrained by upper surface 13 of the housing so that the interior neck mold 2, and particularly the annular ridge 12, can be disengaged from seat 34 in the container neck.

After this step the cycle is completed, the formed article is removed from the neck mold and trimmed as desired to remove either the excess parison material 24 or the radially outwardly extending lip 23. However, it is presently preferred to retain the lip on the finished article in that it enables easier handling of the disc insert closure. This cycle is then repeated as described.

The essence of this invention relates to a container interior neck mold having the essential elements of the apparatus described and illustrated in drawings and the cooperation of that apparatus with a container mold having an exterior neck mold portion substantially conforming to the molding surface of the interior neck mold. This idea is particularly adaptable to blow molding wherein a parison or plastic sheet material is sealed within a mold and caused to conform by differential pressure i.e. internal pressure or external vacuum, to the interior of a mold cavity. In this regard, essentially any form of blow molding operation can be employed. In addition, there are no limitations on the type of thermoplastic material that can be used to form the container.

I claim:
1. Blow molding apparatus for forming molded articles having a neck portion comprising (1) reciprocally mounted mold parts defining a cavity conforming to the shape of the article to be molded when closed, (2) exterior neck mold means positioned in said mold parts at one extremity of said cavity defining the exterior of said neck portion when closed, (3) interior neck forming means reciprocally mounted along the central axis of said neck mold when closed and comprising interior lip molding means comprising a sleeve axially reciprocally mounted over an interior neck mold, the interior neck mold being reciprocally mounted and having an outer surface conforming to the interior of said article neck to form an annular groove in said molded article, said annular groove tapering axially outwardly from said interior neck mold to a maximum diameter toward the interior of the molded article which diameter is no greater than the inner diameter of the interior lip molding means and then extending radially inwardly to the minimum diameter of the interior neck mold and (4) means for retracting said interior neck mold axially relative to said exterior neck mold and said sleeve, using said sleeve as a reaction member to disengage said interior neck mold from said annular groove molded in said article.

2. The apparatus of claim 1 further comprising means cooperating between said sleeve and said interior neck mold for limiting the relative axial movement of said sleeve and said interior neck mold.

3. The apparatus of claim 1 further comprising a fluid conduit within said interior neck mold in intermittent communication between said mold cavity and a fluid source.

References Cited

UNITED STATES PATENTS

| 3,209,401 | 10/1965 | Mehnert | 18—5 |
| 3,224,038 | 12/1965 | Budesheim | 18—5 |
| 3,466,702 | 9/1969 | Stenger | 18—5 |

FOREIGN PATENTS

| 276,980 | 11/1964 | Australia. | |

H. A. KILBY, JR., Primary Examiner